(12) United States Patent
Miura et al.

(10) Patent No.: US 9,338,393 B2
(45) Date of Patent: May 10, 2016

(54) BROADCAST RECEIVING APPARATUS

(71) Applicant: Alpine Electronics, Inc., Tokyo (JP)

(72) Inventors: Sho Miura, Fukushima (JP); Akihito Suzuki, Fukushima (JP)

(73) Assignee: Alpine Electronics, Inc., Tokyo (JP)

(*) Notice: Subject to any disclaimer, the term of this patent is extended or adjusted under 35 U.S.C. 154(b) by 0 days.

(21) Appl. No.: 14/741,002

(22) Filed: Jun. 16, 2015

(65) Prior Publication Data

US 2016/0065890 A1 Mar. 3, 2016

(30) Foreign Application Priority Data

Aug. 27, 2014 (JP) ................................. 2014-172860

(51) Int. Cl.
| | | |
|---|---|---|
| *H04N 5/46* | (2006.01) | |
| *H04N 7/045* | (2006.01) | |
| *H04B 1/06* | (2006.01) | |
| *H04N 5/60* | (2006.01) | |

(52) U.S. Cl.
CPC ................. *H04N 7/045* (2013.01); *H04B 1/06* (2013.01); *H04N 5/60* (2013.01)

(58) Field of Classification Search
USPC ......... 348/729, 731, 735, 739, 761, 725, 711, 348/500, 521, 530, 531, 536, 540, 543, 545, 348/547, 553, 563, 629, 837, 457, 499, 477, 348/478, 479, 495, 354, 398.1, 289
See application file for complete search history.

(56) References Cited

U.S. PATENT DOCUMENTS

| | | | | | |
|---|---|---|---|---|---|
| 4,958,228 A | * | 9/1990 | Kutsuki | ................ | H04N 5/126 331/20 |
| 5,124,792 A | * | 6/1992 | Shimaoka | ................ | H04N 3/27 315/395 |
| 6,084,643 A | * | 7/2000 | Kishtaka | .............. | H04N 5/4401 348/553 |
| 7,652,691 B2 | * | 1/2010 | Suwa | ................ | H04N 5/23245 348/230.1 |
| 7,821,571 B2 | * | 10/2010 | Kitagata | ............ | H04N 5/23245 348/221.1 |
| 7,907,193 B2 | * | 3/2011 | Suwa | .................... | H04N 5/343 348/241 |
| 2002/0118291 A1 | * | 8/2002 | Ishigami | .............. | H04N 3/1537 348/311 |
| 2004/0027485 A1 | * | 2/2004 | Kubota | .................... | H04N 5/45 348/553 |
| 2007/0040821 A1 | * | 2/2007 | Senda | ................ | G09G 3/3685 345/204 |
| 2007/0052568 A1 | * | 3/2007 | Horibata | ............... | H03M 1/804 341/144 |
| 2007/0098386 A1 | * | 5/2007 | Yoneda | .................. | H04N 5/232 396/60 |
| 2009/0017792 A1 | * | 1/2009 | Matsumoto | ......... | G06Q 10/107 455/412.2 |

* cited by examiner

*Primary Examiner* — Jefferey Harold
*Assistant Examiner* — Mustafizur Rahman
(74) *Attorney, Agent, or Firm* — Brinks Gilson & Lione

(57) ABSTRACT

An in-vehicle apparatus includes an FM radio tuner that receives FM broadcast waves of a reception frequency that is set; a FM radio controller; an LCD unit that is capable of changing a horizontal synchronous frequency corresponding to each horizontal line by varying a horizontal blanking period along the horizontal direction, without changing the numbers of effective pixels in horizontal display and vertical display, and an effective display period; a horizontal synchronous frequency setter that sets the horizontal synchronous frequency so that a minimum value of the differences between the reception frequency of the FM broadcast waves and multiplied frequencies that are integral multiples of the horizontal synchronous frequency is higher than or equal to a certain value; and a video processor that generates a video signal necessary to display at least one of a working screen and an operation screen in the LCD unit.

20 Claims, 4 Drawing Sheets

FIG. 3

| RECEPTION FREQUENCY (MHz) | SETTING VALUE | HORIZONTAL SYNCHRONOUS FREQUENCY (kHz) | MINIMUM DIFFERENCE (kHz) |
|---|---|---|---|
| 76.0 | 923 | 40.222 | 19.77 |
| 76.1 | 912 | 40.707 | 18.17 |
| 76.2 | 923 | 40.222 | 19.77 |
| 76.3 | 914 | 40.618 | 19.09 |
| 76.4 | 923 | 40.222 | 19.77 |
| 76.5 | 915 | 40.574 | 18.44 |
| 76.6 | 924 | 40.179 | 19.64 |
| 76.7 | 916 | 40.529 | 18.23 |
| ⋮ | ⋮ | ⋮ | ⋮ |
| 80.0 | 920 | 40.353 | 19.84 |
| 80.1 | 911 | 40.752 | 18.28 |
| 80.2 | 914 | 40.618 | 19.75 |
| 80.3 | 911 | 40.752 | 18.72 |
| 80.4 | 957 | 38.793 | 18.10 |
| 80.5 | 912 | 40.707 | 18.91 |
| 80.6 | 915 | 40.574 | 20.08 |
| 80.7 | 912 | 40.707 | 18.26 |
| ⋮ | ⋮ | ⋮ | ⋮ |
| 89.3 | 914 | 40.618 | 19.34 |
| 89.4 | 925 | 40.135 | 19.05 |
| 89.5 | 914 | 40.618 | 18.19 |
| 89.6 | 913 | 40.663 | 20.18 |
| 89.7 | 912 | 40.707 | 18.75 |
| 89.8 | 918 | 40.441 | 19.85 |
| 89.9 | 912 | 40.707 | 18.42 |
| 90.0 | 911 | 40.752 | 19.76 |

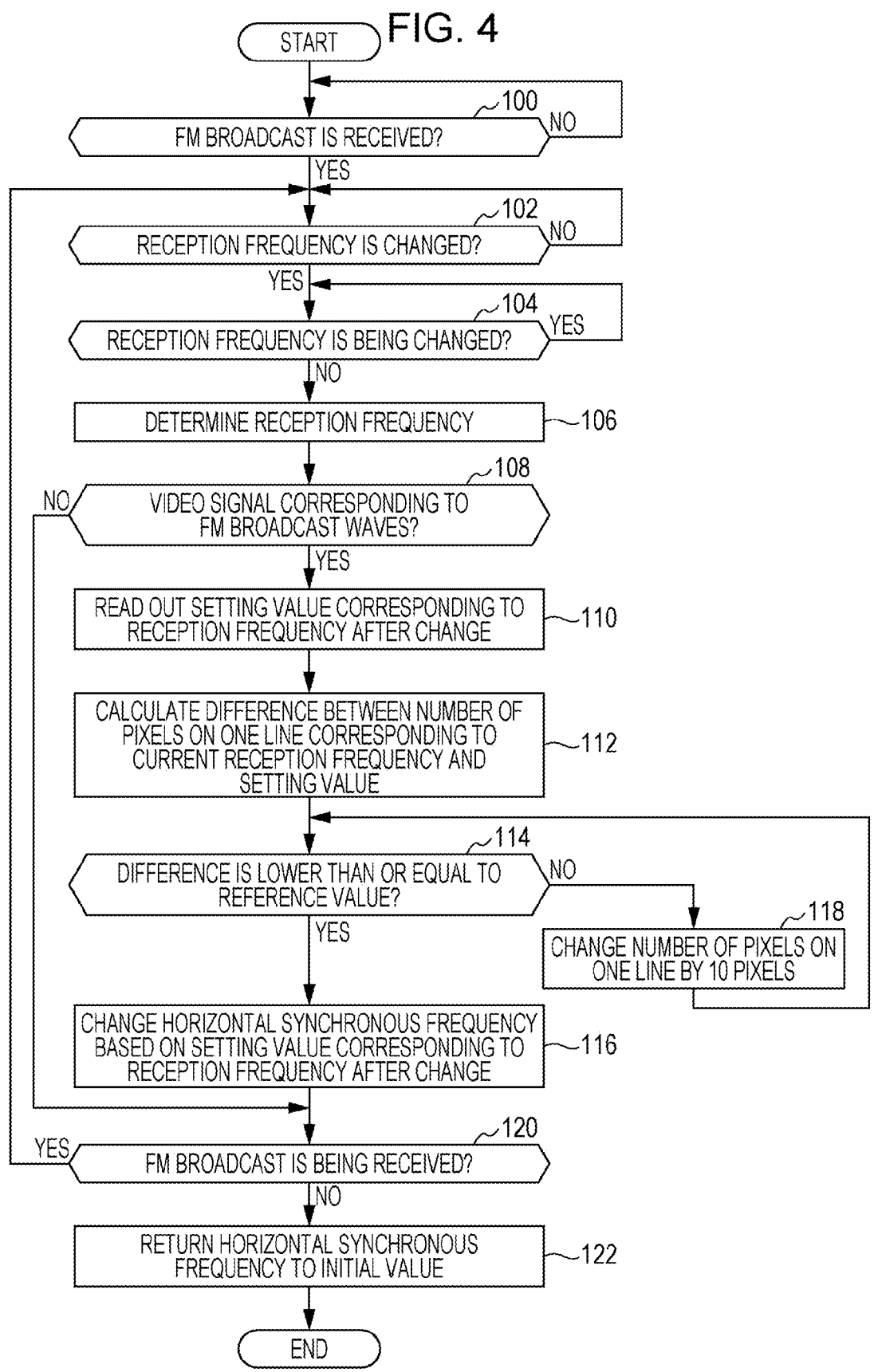

BROADCAST RECEIVING APPARATUS

RELATED APPLICATION

The present application claims priority to Japanese Patent Application Number 2014-172860, filed on Aug. 27, 2014, the entirety of which is hereby incorporated by reference.

BACKGROUND

1. Field

The present disclosure relates to a broadcast receiving apparatus including a display unit, such as a liquid crystal display (LCD).

2. Description of the Related Art

In a display unit composed of a large LCD provided in a frequency modulation (FM) receiver, noises caused by a drive signal for the LCD may be mixed into output sounds such that it is necessary to take measures against the mixing of the noises into the output sounds. For example, in a case in which the dot clock (pixel clock) corresponding to each pixel composing the LCD is equal to 37.125 MHz and a horizontal synchronous frequency is equal to 35.156 kHz, beat components within an audible range of a listener of the FM receiver occur and make annoying noises for the listener when harmonic components that are integral multiples of the horizontal synchronous frequency approach a reception frequency of FM broadcast waves.

Technology in a related art avoids the disadvantage caused by the approach of such a specific communication frequency (reception frequency) to the harmonic components of the operating frequency of the LCD. For example, an electronic device is known in which multiple dot clock frequencies for driving the LCD are prepared, and a dot clock frequency is selected so that the communication frequency band to be used does not interfere with (does not approach) the harmonic components of the dot clock frequency (see Japanese Unexamined Patent Application Publication No. 2010-141538).

In this electronic device, two types of radio communication having different communication frequencies are available. When the harmonic components of the dot clock frequency (for example, 68.35 MHz) for driving the LCD are within a certain range around the communication frequency (for example, 1,575.42 MHz) of one type of radio communication, the dot clock frequency is switched to a different frequency (for example, 68.90 MHz) to prevent the harmonic components of the dot clock frequency from approaching the communication frequency of the radio communication.

Although the dot clock frequency is switched to prevent the harmonic components of the dot clock frequency from interfering with the communication frequency of the radio communication in the electronic device disclosed in Japanese Unexamined Patent Application Publication No. 2010-141538 described above, suppressing the noises included in the output sounds by directly applying this technology to the FM receiver has the following problems:

First, the display unit of the FM receiver generally has a configuration using a fixed dot clock. It is necessary to make a significant change to the configuration in order to switch the dot clock frequency, and it is impractical to provide a mechanism to switch the frequency only for noise reduction. Since change of the resolution of the LCD in, for example, a notebook sized personal computer is assumed in the electronic device in Japanese Unexamined Patent Application Publication No. 2010-141538, a complicated mechanism to switch the dot clock frequency for the change of the resolution is provided in advance.

Second, in Japanese Unexamined Patent Application Publication No. 2010-141538, the dot clock frequency is switched when the notebook sized personal computer functions and the notebook sized personal computer is subsequently used with the switched dot clock frequency. Since the reception frequency is changed in response to an instruction from a user during the operation in the case of the FM receiver, switching the dot clock frequency each time the reception frequency is changed causes a flicker or the like in the display that possibly reduces the display quality.

SUMMARY

Accordingly, it is an object of the present disclosure to provide a broadcast receiving apparatus that is capable of preventing occurrences of noises that are included in output sounds and that are caused by an LCD, without making a significant change to the configuration, and that is capable of suppressing reduction in display quality caused by an occurrence of a flicker in the display in the switching of the reception frequency.

A broadcast receiving apparatus according to an embodiment includes a broadcast receiving unit that receives broadcast waves of a reception frequency that is set; a liquid crystal display unit that is capable of changing a horizontal synchronous frequency corresponding to each line in a horizontal direction by varying a horizontal blanking period along the horizontal direction, without changing the numbers of effective pixels in display in the horizontal direction and display in a vertical direction, and an effective display period; a horizontal synchronous frequency setting unit that sets the horizontal synchronous frequency so that a minimum value of the differences between the reception frequency set in the broadcast receiving unit and multiplied frequencies that are integral multiples of the horizontal synchronous frequency is higher than or equal to a certain value; and, a video processing unit that generates a video signal necessary to display at least one of a working screen corresponding to the reception operation of the broadcast waves and an operation screen in the liquid crystal display unit. In particular, a value higher than an audible range of a user is preferably used as the certain value used in the setting of the horizontal synchronous frequency by the horizontal synchronous frequency setting unit.

With the above configuration, it is possible to reliably prevent occurrences of beat noises included in the audible range of the user, caused by approach of the frequencies that are integral multiples of the horizontal synchronous frequency and the reception frequency of the FM broadcast waves, without a significant change to the configuration of a device, unlike the case in which the dot clock frequency is changed.

The horizontal synchronous frequency setting unit preferably sets the horizontal synchronous frequency each time the frequency of the broadcast waves received by the broadcast receiving unit is changed. With this configuration, it is possible to prevent occurrences of the beat noises for all the reception frequencies, even when the reception frequency of the FM broadcast is switched.

The horizontal synchronous frequency setting unit preferably sets the horizontal synchronous frequency during a vertical blanking period along the vertical direction. With this configuration, it is possible to prevent a flicker of the screen involved in the change of the horizontal synchronous frequency.

The broadcast receiving apparatus preferably further includes a setting information storing unit that stores horizontal synchronous frequency setting information used to identify the horizontal synchronous frequency, the minimum value of the differences between the multiplied frequencies that are integral multiples of which and each frequency of the broadcast waves received by the broadcast receiving unit is higher than or equal to the certain value. The horizontal synchronous frequency setting unit preferably sets the horizontal synchronous frequency on the basis of the horizontal synchronous frequency setting information stored in the setting information storing unit each time the frequency of the broadcast waves received by the broadcast receiving unit is changed. With this configuration, when the reception frequency of the FM broadcast waves is changed, it is possible to simplify the process of setting the horizontal synchronous frequency corresponding to the reception frequency after the change, thereby minimizing occurrences of the beat noises in the change of the reception frequency.

The change of the horizontal synchronous frequency is preferably performed in multiple steps if the difference between the horizontal synchronous frequency before change by the horizontal synchronous frequency setting unit and the horizontal synchronous frequency after the change by the horizontal synchronous frequency setting unit is higher than a reference value. With this configuration, it is possible to suppress large changes of the horizontal synchronous frequency even when the horizontal synchronous frequency is greatly changed with the change of the reception frequency, thereby preventing the user from feeling discomfort from the display.

The change of the horizontal synchronous frequency in multiple steps is preferably performed each time the content of display in the liquid crystal display unit is updated. With this configuration, it is possible to prevent an occurrence of a flicker on the screen each time the horizontal synchronous frequency is changed, even when the horizontal synchronous frequency is changed in multiple steps.

The broadcast receiving apparatus preferably further includes a vertical blanking period adjusting unit that adjusts a length of a vertical blanking period along the vertical direction so that refresh rates before and after the change of the horizontal synchronous frequency by the horizontal synchronous frequency setting unit are kept at a certain value. With this configuration, it is possible to minimize the effect of the change of the horizontal synchronous frequency.

The broadcast receiving unit preferably receives FM broadcast waves. With this configuration, it is possible to reliably prevent occurrences of beat noises involved in the display operation by the liquid crystal display unit in the reception of the FM broadcast waves.

A first video signal generated by the video processing unit and a second video signal other than the first video signal are preferably selectively supplied to the liquid crystal display unit. It is preferred that the change of the horizontal synchronous frequency by the horizontal synchronous frequency setting unit be performed for display corresponding to the first video signal and be not performed for display corresponding to the second video signal. With this configuration, since the measures to vary the horizontal synchronous frequency are taken only if needed (in the output of the sound of the FM broadcast) and the measures are not otherwise taken, it is possible to minimize the effect of the variation in the horizontal synchronous frequency (for example, an occurrence of feeling of discomfort).

BRIEF DESCRIPTION OF THE DRAWINGS

FIG. 3 illustrates an exemplary correspondence table stored in a flash memory; and FIG. 4 is a flowchart illustrating an exemplary operational process of variably setting a horizontal synchronous frequency when the reception frequency of an FM broadcast is switched.

DESCRIPTION OF THE PREFERRED EMBODIMENTS

Figure 1:
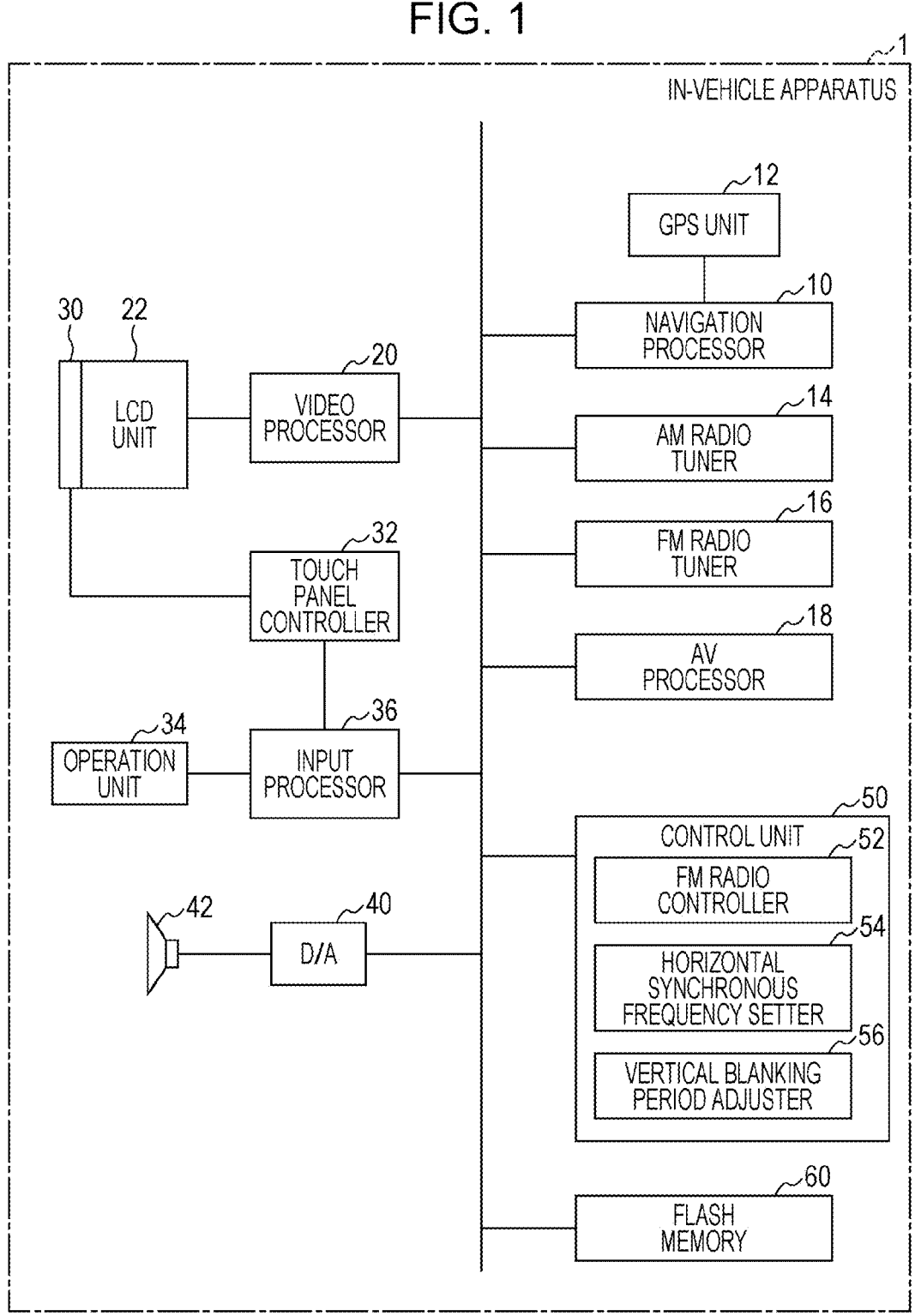
FIG. 1 is a block diagram illustrating an exemplary configuration of an in-vehicle apparatus according to an embodiment.

An in-vehicle apparatus to which a broadcast receiving apparatus according to an embodiment of the present disclosure is applied will herein be described with reference to the attached drawings. FIG. 1 is a block diagram illustrating an exemplary configuration of an in-vehicle apparatus according to an embodiment. Referring to FIG. 1, an in-vehicle apparatus 1 includes a navigation processor 10, an amplitude modulation (AM) radio tuner 14, an FM radio tuner 16, an audio visual (AV) processor 18, a video processor 20, an LCD unit 22, a touch panel 30, a touch panel controller 32, an operation unit 34, an input processor 36, a digital-to-analog converter (D/A) 40, a speaker 42, a control unit 50, and a flash memory 60.

The navigation processor 10 is used with a Global Positioning System (GPS) unit 12 that detects the position of the vehicle. The navigation processor 10 performs a navigation operation using map data to guide the running of the vehicle in which the in-vehicle apparatus 1 is mounted. The AM radio tuner 14 receives an AM broadcast program and plays back a sound corresponding to the content of the program. The FM radio tuner 16 receives an FM broadcast program and plays back a sound corresponding to the content of the program. The AV processor 18 reads out music data and/or video data that is compressed and that is stored in, for example, a hard disk apparatus or a semiconductor memory (not illustrated) and plays back the music data and/or the video data that is read out.

The video processor 20 generates a video signal to display at least one of a working screen corresponding to the operation of each of the navigation processor 10, the AM radio tuner 14, the FM radio tuner 16, and the AV processor 18, and an operation screen, and displays the screen in the LCD unit 22. The video signal includes an LCD drawing dot clock (DotCLK) (having a frequency corresponding to the display cycle of pixels in the horizontal direction), an RGB video data (DATA), and a data enable signal (EN), which is a combined wave of a horizontal synchronous signal and a vertical synchronous signal.

The LCD unit 22 is disposed in the front side of the middle of a driver seat and a front passenger seat. The LCD unit 22 includes, for example, a thin film transistor (TFT) panel and drivers that drive the TFT panel. The drivers include an X driver that supplies a drive signal to data lines corresponding to the pixels arranged in the horizontal direction (X direction), a Y driver that supplies a drive signal to data lines corresponding to the pixels arranged in the vertical direction (Y direction), and a timing controller that generates signals necessary for the operations of the X driver and the Y driver on the basis of the video signal (DotCLK, DATA, and EN) supplied from the video processor 20. For example, the LCD unit 22 having an effective display area (resolution) of horizontal 800 pixels×vertical 480 pixels is used in the present embodiment.

In addition, in the present embodiment, the LCD unit 22 is capable of changing a horizontal synchronous frequency corresponding to each horizontal line by varying a horizontal blanking period along the horizontal direction without varying the numbers of effective pixels (800 pixels×480 pixels) in the horizontal display and the vertical display and an effective display period.

The touch panel 30 is disposed on the surface of a display screen of the LCD unit 22. The touch panel controller 32 performs control necessary for position detection using the touch panel 30. The touch panel 30 and the touch panel controller 32 compose a position detection unit that performs the position detection, for example, in an electrostatic method. Upon display of any of the various operation screens in the LCD unit 22, the user is capable of selecting a display item included in the operation screen by directly touching part of the operation screen with his/her finger or the like. The touch panel 30, which detects the position of the finger or the like, is provided in order to enable such an operation using the operation screen.

The operation unit 34 accepts an operation by the user for the in-vehicle apparatus 1. The operation unit 34 includes, for example, various operation keys, operation switches, and operation buttons arranged on the periphery of the LCD unit 22. The input processor 36 monitors the content of an operation with the operation unit 34 and the content of detection by the touch panel controller 32 and determines the content of the operation by the user.

The digital-to-analog converter 40 converts audio data or music data generated by the processing in each of the navigation processor 10, the AM radio tuner 14, the FM radio tuner 16, and the AV processor 18 into an analog audio signal and outputs the analog audio signal from the speaker 42. Although an amplifier that amplifies the signal is practically connected between the digital-to-analog converter 40 and the speaker 42, the amplifier is omitted in FIG. 1. Although combinations of the digital-to-analog converter 40 and the speaker 42 of the number of playback channels are provided, only one combination of the digital-to-analog converter 40 and the speaker 42 is illustrated in FIG. 1.

The control unit 50 controls the entire in-vehicle apparatus 1. The control unit 50 is realized by execution of certain programs stored in, for example, a read only memory (ROM) or a random access memory (RAM) by a central processing unit (CPU).

In general, when the differences between multiplied frequencies that are integral multiples of the horizontal synchronous frequency of the LCD unit 22 and a reception frequency of FM broadcast waves are lower than a certain value (lower than an upper limit (for example, 17 kHz) of the audible range of the user) during output of sounds corresponding to the content of the FM broadcast waves received with the FM radio tuner 16, noises (beat noises) of frequencies corresponding to the differences are mixed into the sounds that are being output.

In the in-vehicle apparatus 1 of the present embodiment, the horizontal synchronous frequency of the LCD unit 22 is variably set for each reception frequency so that the beat noises are not mixed during the reception of the FM broadcast in order to prevent the mixing of the beat noises. The control unit 50 includes an FM radio controller 52, a horizontal synchronous frequency setter 54, and a vertical blanking period adjuster 56 in order to perform the reception control of the FM broadcast waves and the variable setting of the horizontal synchronous frequency of the LCD unit 22.

The FM radio controller 52 controls the reception operation of the FM broadcast waves by the FM radio tuner 16. This control includes switching of the FM broadcast station (change of the reception frequency) and generation of the operation screen for the switching. Methods of switching the FM broadcast station may include a method of allocating multiple broadcast stations to multiple preset keys in advance and switching to the broadcast station corresponding to a preset key that is pressed, a method of increasing or decreasing the reception frequency until broadcast waves are detected when an up-down key of the reception frequency is pressed for a long time (seek operation), and a method of increasing or decreasing the reception frequency by 0.1 MHz when the up-down key is pressed multiple times at short intervals (manual switching operation).

The horizontal synchronous frequency setter 54 sets (changes) the horizontal synchronous frequency of the LCD unit 22 so that a minimum value of the differences between the reception frequency of the FM broadcast waves set by the FM radio controller 52 and the multiplied frequencies that are integral multiples of the horizontal synchronous frequency of the LCD unit 22 is higher than or equal to a certain value (a value higher than the audible range of the user). A value higher than the audible range of the user is used as the certain value used in the setting of the horizontal synchronous frequency. For example, when the upper limit of the audible range of the user is about 15 kHz, a value of 17 kHz higher than the upper limit is used as the certain value.

The setting of the horizontal synchronous frequency by the horizontal synchronous frequency setter 54 is performed each time the reception frequency of the FM broadcast waves is changed by varying the length of the horizontal blanking period. In particular, the setting of the horizontal synchronous frequency is performed during a vertical blanking period of the LCD unit 22.

In the present embodiment, flash memory 60 is provided, which stores horizontal synchronous frequency setting information as a correspondence table. The horizontal synchronous frequency setting information is used to identify the horizontal synchronous frequency, the minimum value of the differences between the multiplied frequencies that are integral multiples of which and each reception frequency of the FM broadcast waves is higher than or equal to the certain value.

Each time the reception frequency of the FM broadcast waves is changed, the horizontal synchronous frequency setter 54 sets the horizontal synchronous frequency corresponding to the reception frequency after the change using the correspondence table stored in the flash memory 60.

Figure 2:
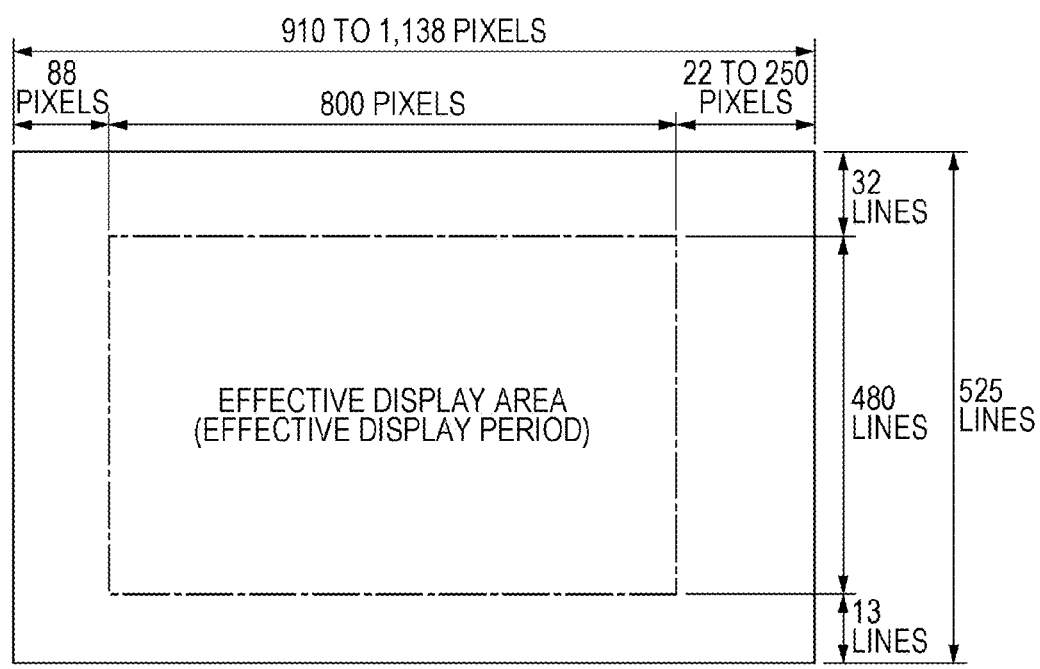
FIG. 2 illustrates an example of an effective display area (period) of an LCD unit, horizontal blanking periods, and vertical blanking periods.

FIG. 2 illustrates an example of the effective display area (period) of the LCD unit 22, the horizontal blanking periods, and the vertical blanking periods. Referring to FIG. 2, the LCD unit 22 of the present embodiment has the effective display area of 800 pixels×480 pixels. The frequency of the dot clock corresponding to each pixel is fixed (for example, is fixed to 37.125 MHz). In other words, the time required to display 800 pixels×480 pixels (the effective display period) is set to a constant value and the horizontal synchronous frequency is variably set by adjusting the length of the horizontal blanking period.

Specifically, each line along the horizontal direction includes a fixed horizontal blanking period of 88 pixels (dots), the effective display period of 800 pixels, and a variable horizontal blanking period of 22 pixels to 250 pixels. In other words, the number of pixels of each line including the fixed horizontal blanking period and the variable horizontal blanking period is 910 pixels to 1,138 pixels. When the dot clock frequency, which is the frequency of one pixel, is 37.125 MHz, the audible range of the horizontal synchronous frequency is 32.623 kHz to 40.797 kHz.

In addition, a fixed vertical blanking period of 32 lines, the effective display period of 480 lines, and a fixed vertical blanking period of 13 lines are included along the vertical direction. The variable setting of the horizontal synchronous frequency by the horizontal synchronous frequency setter 54 is performed within the fixed vertical blanking period of 32 lines (may be performed within the fixed vertical blanking period of 13 lines).

FIG. 3 illustrates an example of the correspondence table stored in the flash memory 60. As illustrated in FIG. 3, the correspondence table includes a setting value, a horizontal synchronous frequency (kHz), and a minimum difference (kHz) for each reception frequency. The setting value indicates the number of pixels (the number of dot clocks) included in one horizontal line, which is calculated by summing up the fixed horizontal blanking period, the effective display period, and the variable horizontal blanking period illustrated in FIG. 2. The horizontal synchronous frequency indicates the horizontal synchronous frequency corresponding to the setting value. The minimum difference indicates the minimum value of the differences between the multiple multiplied frequencies that are integral multiples of the horizontal synchronous frequency and the reception frequency. Practically, it is sufficient to indicate the setting value corresponding to the reception frequency. Although the horizontal synchronous frequency and the minimum difference corresponding to each setting value are included in the correspondence table in FIG. 3 for description, the practical correspondence table does not include the horizontal synchronous frequency and the minimum difference corresponding to each setting value.

The vertical blanking period adjuster 56 adjusts the length of the vertical blanking period along the vertical direction so that refresh rates before and after change are kept at a constant value when the setting of the horizontal blanking period by the horizontal synchronous frequency setter 54 is changed. As described above, varying the number of pixels of each line in the horizontal direction and fixing the number of lines (525 lines) in the vertical direction vary the time required to display one screen to vary the refresh rate (the number of display frames per unit time) with the change of the horizontal synchronous frequency. The vertical blanking period adjuster 56 adjusts the length of the vertical blanking period to set the time required to display one screen to a substantially constant value. The operation of the vertical blanking period adjuster 56 is an option. Whether the adjustment is performed may be specified the user, a product developer, or a maker. When the optional operation is not necessary, the vertical blanking period adjuster 56 may be omitted.

The FM radio tuner 16 and the FM radio controller 52 described above correspond to a broadcast receiving unit; the LCD unit 22 corresponds to a liquid crystal display unit; the horizontal synchronous frequency setter 54 corresponds to a horizontal synchronous frequency setting unit; the video processor 20 corresponds to a video processing unit; the flash memory 60 corresponds to a setting information storing unit; and, the vertical blanking period adjuster 56 corresponds to a vertical blanking period adjusting unit.

An operation to switch the reception frequency of the FM broadcast in the in-vehicle apparatus 1 of the present embodiment having the above configuration will now be described with reference to FIG. 4. FIG. 4 is a flowchart illustrating an exemplary operational process of variably setting the horizontal synchronous frequency when the reception frequency of the FM broadcast is switched.

Referring to FIG. 4, at start of the operation upon power-on of the in-vehicle apparatus 1, in Step 100, the horizontal synchronous frequency setter 54 determines whether the FM broadcast is received. If the FM broadcast is not received, the horizontal synchronous frequency setter 54 performs the negative determination (NO in Step 100) and the determination in Step 100 is repeated. If the FM broadcast is received (when the reception of the FM broadcast is specified by the user or when the FM broadcast has already been received prior to power-off of the in-vehicle apparatus 1, and the state is continued at the power-on of the in-vehicle apparatus 1), the horizontal synchronous frequency setter 54 performs the affirmative determination (YES in Step 100).

In Step 102, the horizontal synchronous frequency setter 54 determines whether the reception frequency of the FM broadcast is changed. If the reception frequency of the FM broadcast is not changed, the horizontal synchronous frequency setter 54 performs the negative determination (NO in Step 102) and the determination in Step 102 is repeated. If the reception frequency of the FM broadcast is changed (when the user has issued an instruction to change the reception frequency of the FM broadcast), the horizontal synchronous frequency setter 54 performs the affirmative determination (YES in Step 102).

In Step 104, the horizontal synchronous frequency setter 54 determines whether the reception frequency is being changed. For example, when the seek operation or the manual switching operation using the up-down key is being performed, the horizontal synchronous frequency setter 54 determines that the reception frequency is being changed. In this case, the horizontal synchronous frequency setter 54 performs the affirmative determination (YES in Step 104) and the determination in Step 104 is repeated. If the change of the reception frequency is finished, the horizontal synchronous frequency setter 54 performs the negative determination (NO in Step 104). In Step 106, the FM radio controller 52 determines the reception frequency of the FM broadcast.

In Step 108, the horizontal synchronous frequency setter 54 determines whether the content of the display in the LCD unit 22 corresponds to a video signal (a first video signal) corresponding to the FM broadcast waves. For example, when the operation screen or the working screen used to instruct switching of the frequency of the FM broadcast waves that are being received or the reception frequency is being displayed, the horizontal synchronous frequency setter 54 performs the affirmative determination (YES in Step 108).

In Step 110, the horizontal synchronous frequency setter 54 reads out the setting value corresponding to the reception frequency after the change (the number of pixels (the number of dot clocks) corresponding to one horizontal line) with reference to the correspondence table stored in the flash memory 60. In Step 112, the horizontal synchronous frequency setter 54 calculates the difference between the number of pixels (the number of dot clocks) on one line corresponding to the current reception frequency and the number of pixels on one line corresponding to the reception frequency after the change.

In Step 114, the horizontal synchronous frequency setter 54 determines whether the difference between the numbers of pixels calculated in Step 112 is lower than or equal to a reference value (for example, 10). If the difference between the numbers of pixels is lower than or equal to the reference value, the horizontal synchronous frequency setter 54 performs the affirmative determination (YES in Step 114). In Step 116, the horizontal synchronous frequency setter 54 changes the horizontal synchronous frequency (the number of pixels and the number of dot clocks composing one line) on the basis of the setting value corresponding to the reception frequency after the change read out in Step 110. This change is performed during the vertical blanking period.

If the difference between the numbers of pixels calculated in Step 112 exceeds the reference value, the horizontal synchronous frequency setter 54 performs the negative determination (NO in Step 114). In Step 118, the horizontal synchronous frequency setter 54 changes the number of pixels on one line corresponding to the current reception frequency toward the number of pixels on one line after the reception frequency is changed by 10 pixels. This change is performed during the vertical blanking period each time the content of display in the LCD unit 22 is updated (each time the display frame is switched). Then, the process goes back to Step 114 to determine whether the difference between the numbers of pixels is lower than or equal to the reference value.

After the horizontal synchronous frequency (the number of pixels composing one line) is changed in Step 116 or after the determination in Step 108 is negative (NO in Step 108) when the content of display in the LCD unit 22 corresponds to a video signal (a second video signal) other than the first video signal corresponding to the FM broadcast waves, in Step 120, the horizontal synchronous frequency setter 54 determines whether the FM broadcast is being received. If the FM broadcast is being received, the horizontal synchronous frequency setter 54 performs the affirmative determination (YES in Step 120). In this case, the process goes back to Step 102 to determine whether the reception frequency is changed. If the reception of the FM broadcast is finished (for example, the user instructs termination of the listening of the FM broadcast or the user instructs switching to another operation, such as the navigation operation or the AM broadcast reception), the horizontal synchronous frequency setter 54 performs the negative determination (NO in Step 120). In Step 122, the horizontal synchronous frequency setter 54 returns the horizontal synchronous frequency to an initial value (for example, 35.156 kHz). Then, the operational process of variably setting the horizontal synchronous frequency illustrated in FIG. 4 is terminated.

As described above, in the in-vehicle apparatus 1 of the present embodiment, it is possible to reliably prevent occurrences of the beat noises included in the audible range of the user, caused by approach of the frequencies that are integral multiples of the horizontal synchronous frequency and the reception frequency of the FM broadcast waves, without a significant change to the configuration of a device, unlike the case in which the dot clock frequency is changed.

In addition, it is possible to prevent occurrences of the beat noises for all the reception frequencies after the change by setting the horizontal synchronous frequency each time the reception frequency of the FM broadcast waves is changed. Furthermore, it is possible to prevent the flicker of the screen involved in the change of the horizontal synchronous frequency by setting the horizontal synchronous frequency during the vertical blanking period.

Furthermore, the in-vehicle apparatus 1 includes the flash memory 60 including the correspondence table, which stores the horizontal synchronous frequency setting information as the correspondence table. The horizontal synchronous frequency setting information is used to identify the horizontal synchronous frequency, the minimum value of the differences between the multiplied frequencies that are integral multiples of which and each reception frequency of the FM broadcast waves is higher than or equal to the certain value. The horizontal synchronous frequency is set on the basis of the correspondence table each time the reception frequency of the FM broadcast waves is changed. Accordingly, when the reception frequency of the FM broadcast waves is changed, it is possible to simplify the process of setting the horizontal synchronous frequency corresponding to the reception frequency after the change, thereby minimizing occurrences of the beat noises in the change of the reception frequency.

Furthermore, the change of the horizontal synchronous frequency is performed in multiple steps if the difference between the horizontal synchronous frequency before change and the horizontal synchronous frequency after change is higher than or equal to a reference value (if the difference between the numbers of pixels (the numbers of dot clocks) included on the respective horizontal lines exceeds 10 in the example illustrated in FIG. 4). Accordingly, it is possible to suppress large change of the horizontal synchronous frequency even when the horizontal synchronous frequency is greatly changed with the change of the reception frequency, thereby preventing the user from feeling discomfort from viewing the display. In particular, the change of the horizontal synchronous frequency in multiple steps is performed each time the content of display in the liquid crystal display unit is updated (during the vertical blanking period). Accordingly, it is possible to prevent an occurrence of the flicker on the screen each time the horizontal synchronous frequency is changed even when the horizontal synchronous frequency is changed in multiple steps.

Furthermore, it is possible to minimize the effect of the change of the horizontal synchronous frequency by adjusting the length of the vertical blanking period along the vertical direction (when the adjustment operation by the vertical blanking period adjuster 56, which is an option, is made effective) so that the refresh rates before and after the change of the horizontal synchronous frequency are kept at a constant value.

Furthermore, since the measures to vary the horizontal synchronous frequency are taken only if needed (in the output of the sound of the FM broadcast) and the measures are not otherwise taken, it is possible to minimize the effect of the variation in the horizontal synchronous frequency (for example, an occurrence of the feeling of discomfort).

While described in terms of some specific examples and embodiments, it will be clear that the disclosure is not limited to these specific examples and embodiments, and that many changes and modified embodiments will be obvious to those skilled in the art without departing from the true spirit and scope of the disclosure. For example, although the occurrences of the beat noises caused by the horizontal synchronous frequency of the LCD unit 22 included in the output of the sound in the reception of the FM broadcast waves are prevented in the above embodiments, the present disclosure is also applicable to occurrences of the beat noises when broadcast waves other than the FM broadcast waves are received, for example, when AM broadcast waves are received.

Although the horizontal synchronous frequency setting information (the correspondence table) is stored in the flash memory 60 in the above embodiments, similar information may be stored in another semiconductor memory or hard disk.

As described above, according to the present disclosure, it is possible to reliably prevent the occurrences of the beat noises included in the audible range of the user, caused by approach of the frequencies that are integral multiples of the horizontal synchronous frequency and the reception frequency of the FM broadcast waves, without a significant change to the configuration, unlike the case in which the dot clock frequency is changed.

Although the present disclosure is applied to the case in which the operation screen or the working screen is displayed in the reception of the FM broadcast in the above embodiments, the present disclosure is also applicable to a case in which a video other than the operation screen and the working screen is displayed in the reception of the FM broadcast because the refresh rates are kept at a constant value when the adjustment operation by the vertical blanking period adjuster 56, which is an option, is enabled. For example, the present disclosure is applicable to a case in which the user listens to the sound of the FM broadcast while a map around the position of the vehicle is being displayed during the navigation operation.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teaching of the invention without departing from the central scope thereof. Therefore, it is intended that this invention not be limited to the particular embodiments disclosed, but that the invention will include all embodiments falling within the scope of the appended claims.

What is claimed is:

1. A broadcast receiving apparatus comprising:
   a broadcast receiving unit that receives broadcast waves of a reception frequency that is set;
   a liquid crystal display unit that is capable of changing a horizontal synchronous frequency corresponding to each line in a horizontal direction by varying a horizontal blanking period along the horizontal direction, without changing the numbers of effective pixels in display in the horizontal direction and display in a vertical direction, and an effective display period;
   a horizontal synchronous frequency setting unit that sets the horizontal synchronous frequency so that a minimum value of differences between the reception frequency set in the broadcast receiving unit and multiplied frequencies that are integral multiples of the horizontal synchronous frequency is higher than or equal to a certain value; and,
   a video processing unit that generates a video signal necessary to display at least one of a working screen corresponding to the reception operation of the broadcast waves and an operation screen in the liquid crystal display unit.

2. The broadcast receiving apparatus according to claim 1, wherein a value higher than an audible range of a user is used as the certain value used in the setting of the horizontal synchronous frequency by the horizontal synchronous frequency setting unit.

3. The broadcast receiving apparatus according to claim 1, wherein the horizontal synchronous frequency setting unit sets the horizontal synchronous frequency each time the frequency of the broadcast waves received by the broadcast receiving unit is changed.

4. The broadcast receiving apparatus according to claim 3, wherein the horizontal synchronous frequency setting unit sets the horizontal synchronous frequency during a vertical blanking period along the vertical direction.

5. The broadcast receiving apparatus according to claim 3, further comprising:
   a setting information storing unit that stores horizontal synchronous frequency setting information used to identify the horizontal synchronous frequency, the minimum value of the differences between the multiplied frequencies that are integral multiples of which and each frequency of the broadcast waves received by the broadcast receiving unit is higher than or equal to the certain value,
   wherein the horizontal synchronous frequency setting unit sets the horizontal synchronous frequency on the basis of the horizontal synchronous frequency setting information stored in the setting information storing unit each time the frequency of the broadcast waves received by the broadcast receiving unit is changed.

6. The broadcast receiving apparatus according to claim 1, wherein the change of the horizontal synchronous frequency is performed in multiple steps if a difference between the horizontal synchronous frequency before change by the horizontal synchronous frequency setting unit and the horizontal synchronous frequency after the change by the horizontal synchronous frequency setting unit is higher than a reference value.

7. The broadcast receiving apparatus according to claim 6, wherein the change of the horizontal synchronous frequency in multiple steps is performed each time content of display in the liquid crystal display unit is updated.

8. The broadcast receiving apparatus according to claim 1, further comprising:
   a vertical blanking period adjusting unit that adjusts a length of a vertical blanking period along the vertical direction so that refresh rates before and after the change of the horizontal synchronous frequency by the horizontal synchronous frequency setting unit are kept at a certain value.

9. The broadcast receiving apparatus according to claim 1, wherein the broadcast receiving unit receives FM broadcast waves.

10. The broadcast receiving apparatus according to claim 9, wherein a first video signal generated by the video processing unit and a second video signal other than the first video signal are selectively supplied to the liquid crystal display unit, and
    wherein the change of the horizontal synchronous frequency by the horizontal synchronous frequency setting unit is performed for display corresponding to the first video signal and is not performed for display corresponding to the second video signal.

11. A method of receiving a broadcast and displaying a video signal, the method comprising: receiving, by a broadcast receiving unit, broadcast waves of a reception frequency that is set;
    changing, in a liquid crystal display, a horizontal synchronous frequency corresponding to each line in a horizontal direction by varying a horizontal blanking period along the horizontal direction, without changing the numbers of effective pixels in display in the horizontal direction and display in a vertical direction, and an effective display period;
    setting, by a horizontal synchronous frequency setting unit, the horizontal synchronous frequency so that a minimum value of differences between the reception frequency set in the broadcast receiving unit and multiplied frequencies that are integral multiples of the horizontal frequency is higher than or equal to a certain value; and,
    generating, by a video processing unit, a video signal necessary to display at least one of working screen corresponding to the reception operation of the broadcast waves and an operation screen in the liquid crystal display.

12. The method of claim 11, wherein a value higher than an audible range of a user is used as the certain value used in the setting of the horizontal synchronous frequency by the horizontal synchronous frequency setting unit.

13. The method of claim 11, wherein the horizontal synchronous frequency setting unit sets the horizontal synchronous frequency each time the frequency of the broadcast waves received by the broadcast receiving unit is changed.

14. The method of claim 13, wherein the horizontal synchronous frequency setting unit sets the horizontal synchronous frequency during a vertical blanking period along the vertical direction.

15. The method of claim 13, further comprising:
storing, by a setting information storing unit, horizontal synchronous frequency setting information used to identify the horizontal synchronous frequency, the minimum value of the differences between the multiplied frequencies that are integral multiples of which and each frequency of the broadcast waves received by the broadcast receiving unit is higher than or equal to the certain value; and,
setting, by the horizontal synchronous frequency setting unit, the horizontal synchronous frequency on the basis of the horizontal synchronous frequency setting information stored in the setting information storing unit each time the frequency of the broadcast waves received by the broadcast receiving unit is changed.

16. The method of claim 11, wherein the change of the horizontal synchronous frequency is performed in multiple steps if a difference between the horizontal synchronous frequency before change by the horizontal synchronous frequency setting unit and the horizontal synchronous frequency after the change by the horizontal synchronous frequency setting unit is higher than a reference value.

17. The method of claim 16, wherein the change of the horizontal synchronous frequency in multiple steps is performed each time content of display in the liquid crystal display unit is updated.

18. The method of claim 11, further comprising:
adjusting, by a vertical blanking period adjusting unit, a length of a vertical blanking period along the vertical direction so that refresh rates before and after the change of the horizontal synchronous frequency by the horizontal synchronous frequency setting unit are kept at a certain value.

19. The method of claim 11, wherein the broadcast receiving unit receives FM broadcast waves.

20. The method of claim 19,
wherein a first video signal generated by the video processing unit and a second video signal other than the first video signal are selectively supplied to the liquid crystal display unit, and
wherein the change of the horizontal synchronous frequency by the horizontal synchronous frequency setting unit is performed for display corresponding to the first video signal and is not performed for display corresponding to the second video signal.

* * * * *